United States Patent [19]

Slavinski et al.

[11] 4,020,545
[45] May 3, 1977

[54] APPARATUS FOR AUTOMATIC TOOL CHANGING IN A LATHE

[75] Inventors: Ivan Assenov Slavinski; Todor Dimitrov Angelov; Dmitri Dmitrievich Vukolov; Eduard Todorov Burgudjiev; Mihail Dimitrov Komitovski, all of Sofia, Bulgaria

[73] Assignee: DSO "ZMM", Sofia, Bulgaria

[22] Filed: Feb. 25, 1974

[21] Appl. No.: 445,478

[30] Foreign Application Priority Data

Feb. 24, 1973 Bulgaria .................................. 22584

[52] U.S. Cl. ................................... 29/568; 29/426
[51] Int. Cl.² .......................................... B23Q 3/155
[58] Field of Search .............................. 29/568, 426

[56] References Cited

UNITED STATES PATENTS

| | | | |
|---|---|---|---|
| 3,466,739 | 9/1969 | Harman | 29/568 |
| 3,584,374 | 6/1971 | Spuhler | 29/568 |
| 3,667,114 | 6/1972 | Smith et al. | 29/568 |
| 3,807,011 | 4/1974 | Harman et al. | 29/568 |

*Primary Examiner*—Othell M. Simpson
*Assistant Examiner*—Z. R. Bilinsky

[57] ABSTRACT

Apparatus for automatic tool changing, such apparatus being situated between the lathe rest and the stationary tool magazine of the lathe. The total changing apparatus contains a basic support frame which can move parallel to the axis of the lathe spindle; a transport unit for following cross-traverse on the support frame, a two-seat tool magazine, and a mechanism for straight-lined translation of the tool units. The basic support frame contains a brace structure and a beam. The brace structure extends along a guideway towards the body of the lathe, while the beam acts as a guideway for the transport unit. The two-seat tool magazine includes a slide fixed to the transport unit; it can move along the beam of the support frame together with the transport unit, as well as independently. It also contains two seats for tool units, rigidly fastened to the slide.

8 Claims, 21 Drawing Figures

APPARATUS FOR AUTOMATIC TOOL CHANGING IN A LATHE

This invention relates to a device for automatic tool changing in a lathe provided with program control, where the tools are fixed in toolholders, the toolholders and tools forming tool units. The lathe is supplied with a tool magazine; the changeable tool units are fixed on its rest or carriage in a one-seat mounting element.

Tool changing devices are known. Generally these known devices include a movable, independent member in the machine with controlled movements, which follows the movement of the lathe rest; the device performs tool changing in the zero position of the fixing element on the rest. The tool changing process includes the transportation of the tools to the magazine and backwards and the manipulations for placing and picking up a tool in the magazine as well as in the fixing element on the rest.

This known construction is accompanied by additional losses of time for bringing the tool into working position, which requires an additional leading away of the rest from the detail, so that the fixing element together with the tools fixed in it can turn around. In the turning of bores by lathes with this construction it is impossible to have synchronization with the pre-positioning of the tool.

It is therefore a general object of the present invention to provide an apparatus which avoids the aforementioned drawbacks of the known devices, and secures maximum synchronization of the movements for tool changing on the rest with the movement for prepositioning of the rest even in turning of openings.

This object is attained by means of the device for automatic tool changing in accordance with the present invention. It is situated between the tool unit carrying the rest or carriage and the tool magazine of the lathe, and contains a basic support frame which can move parallel to the axis of the lathe spindle, a transport unit for following cross-traverse on the support frame, a two-seat tool magazine, and a mechanism for straight-lined translation of the tool units. The basic support frame contains a brace structure and a beam. The brace structure extends along a guideway towards the body of the lathe, while the beam acts as a guideway for the transport unit. The two-seat tool magazine includes a slide fixed to the transport unit; it can move along the beam of the support frame together with the transport unit, as well as independently. In addition, it contains two seats for tool units, rigidly fastened to the slide.

The mechanism for straight-lined translation of the tool units consists of a body, rigidly attached to the transport unit, and an arm. The arm has one end mounted in a bearing in the body, and in its other end there is a movably fastened finger.

The tool changing is done by drawing out and delivering the tool unit in a direction parallel to the axis of the main spindle. Owing to this, the change can take place even when the tool is in the opening of the workpiece being machined. The tool changing is carried out by the two-seat tool magazine in the direction of an adjusting movement, perpendicular to the axis of the main spindle, as well as by the mechanism for straight-lined translation of the tool units parallel to the axis of the machine.

The support frame and the transport unit, carrying the two-seat tool magazine and the mechanism for the translation of the tool unit, make a longitudinal- and cross-traverse by controlled, following movements in both directions. This makes it possible for the changing of the tool unit in the fixing element on the rest to take place in every position of the fixing element in the working zone; besides, the fixing element can shift in a longitudinal direction.

The hydraulic cylinders which set the support frame and the transport unit in motion for a longitudinal- and cross-traverse are controlled by following distributors or valves.

For a better understanding of the invention, reference should be had to the accompanying drawings in which there is illustrated a preferred embodiment of the invention.

Figure 1:
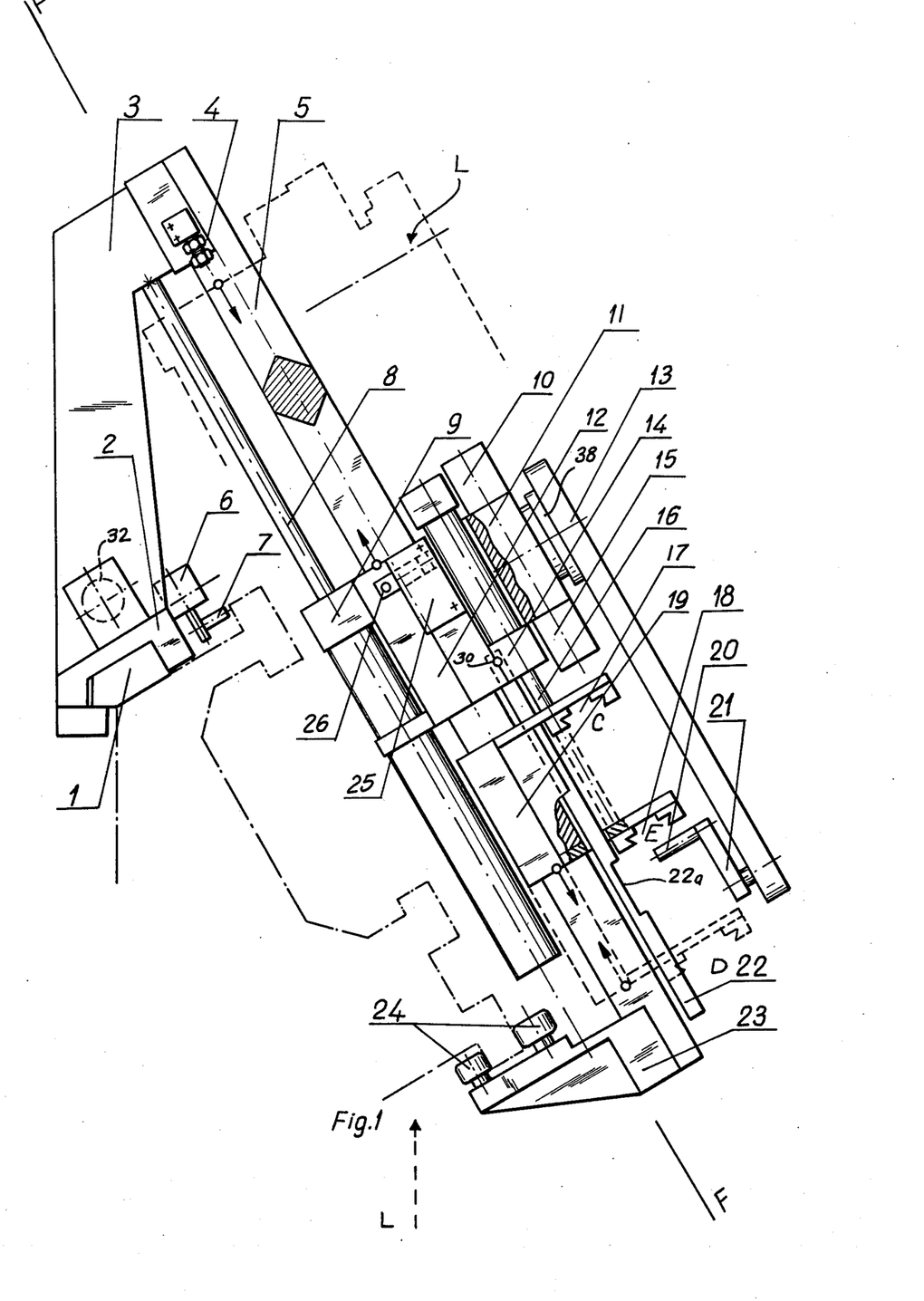
FIG. 1 is a side view of the device of the invention, the device being shown inclined counterclockwise from its actual position with the axis F—F vertical for economy of illustration.
Figure 2:
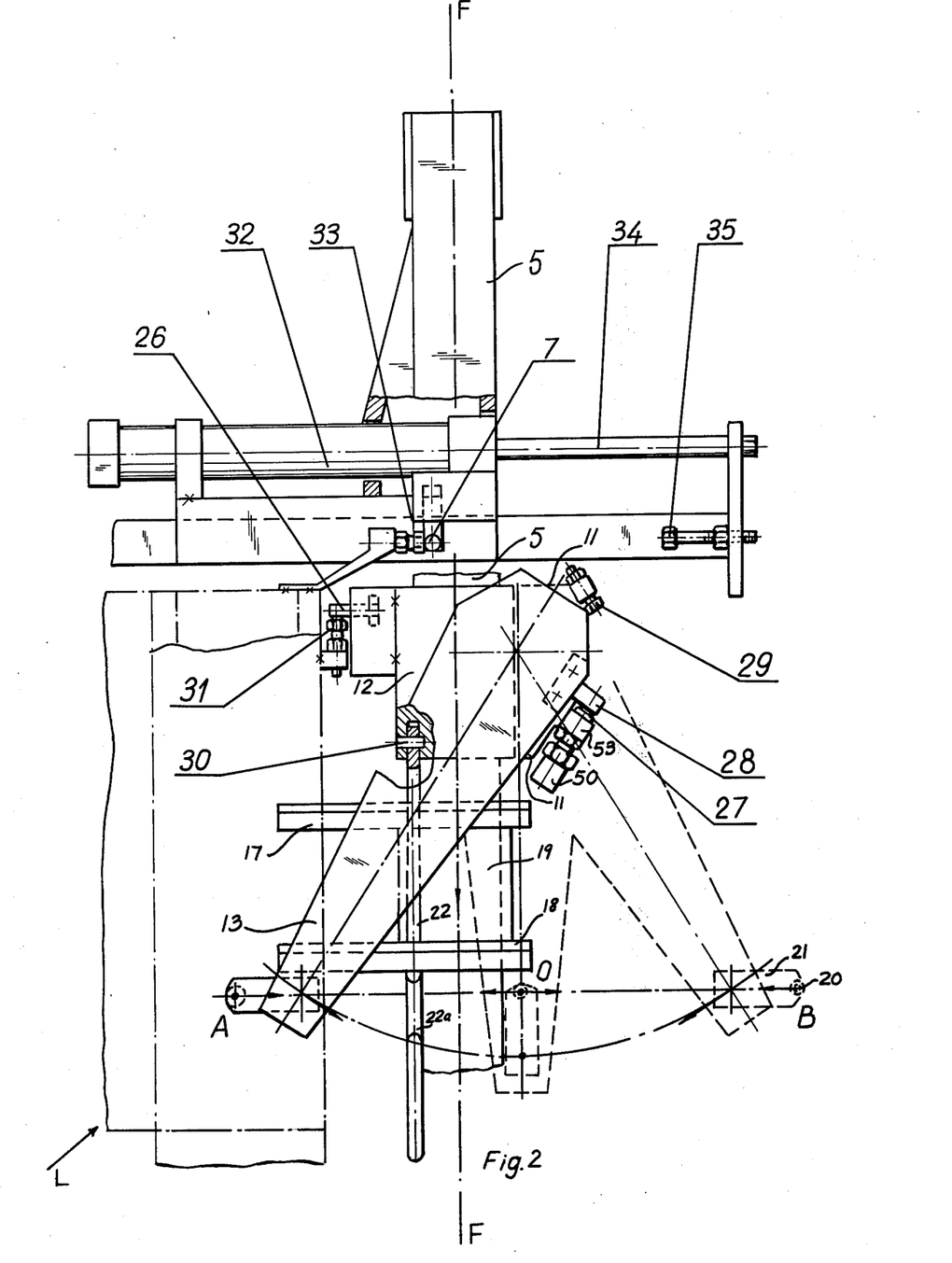
FIG. 2 is a schematic front view of the device.

Turning first to FIGS. 1 and 2, it will be seen that a portion of a lathe L is shown in phantom (dot-dash) lines, and that the tool changing device is shown in solid lines. The tool changing device has a basic support frame having a vertical beam or column 5 of a flattened hexagonal cross-section, which functions as a guideway, the column 5 being connected by a brace 3 at the top thereof to a slide 2 which guidingly engages a guideway 1 on the frame of the lathe L. The bottom end of the column 5 is connected to a guide structure carrying opposed rollers 24 which engage opposite sides of a flange-like guide on the frame of the lathe. The basic support frame, including the column 5, reciprocates relative to the frame of the lathe in a direction which is normal to the plane of the paper in FIG. 1 and horizontally in FIG. 2. A hydraulic cylinder 32 is mounted upon the slide 2 at the lower end of the brace 3, the cylinder 32 having a piston rod 34 the outer end of which is rigidly connected to the frame of the lathe L. A valve 6, which is fastened to the slide 2, is connected to a source of oil pressure (not shown) and to the respective ends of the hydraulic cylinder 32, which is of double-acting construction, by conduit means (not shown).

Figure 7A:
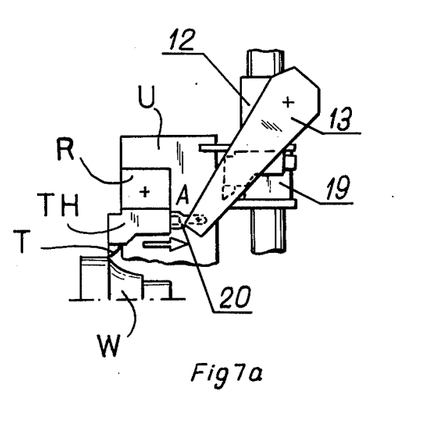
FIG. 7a–7o, inclusive, illustrate the sequency of movements carried out by the tool changing device.
Figure 7B:
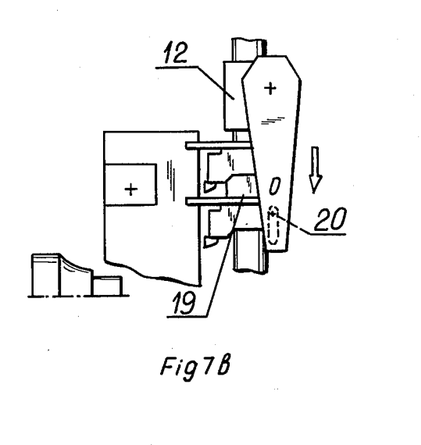
Figure 7C:
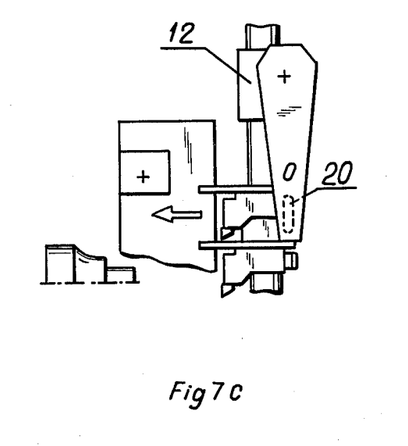
Figure 7D:
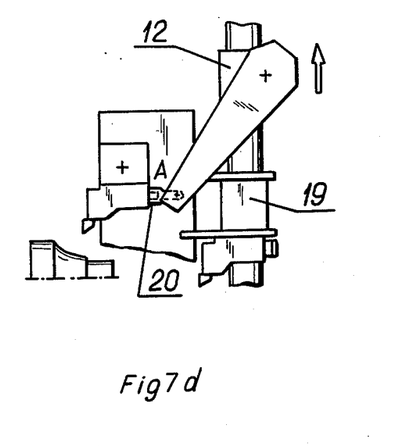
Figure 7E:
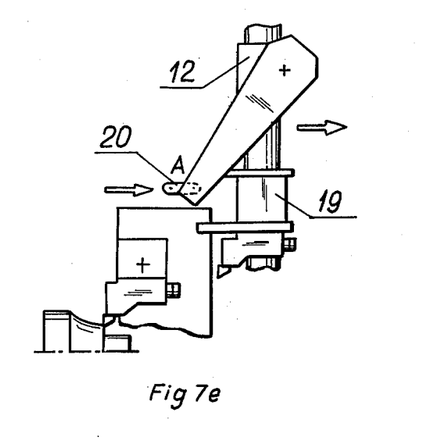
Figure 7F:
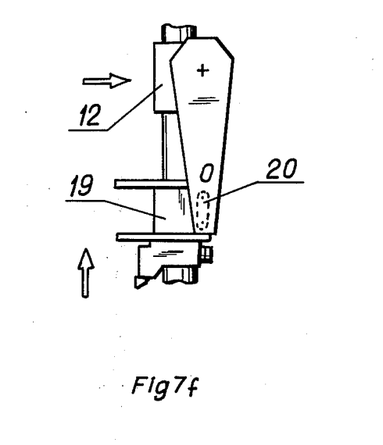
Figure 7G:
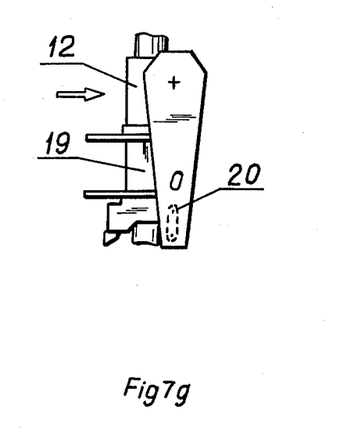
Figure 7H:
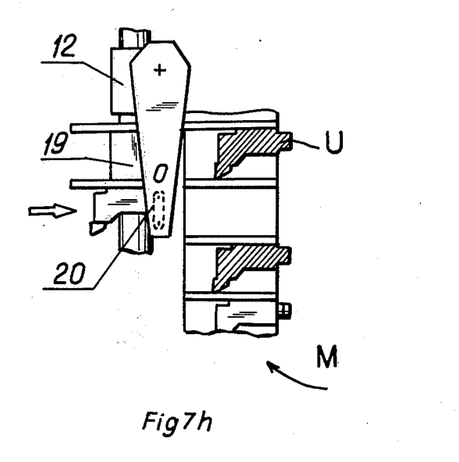
Figure 7I:
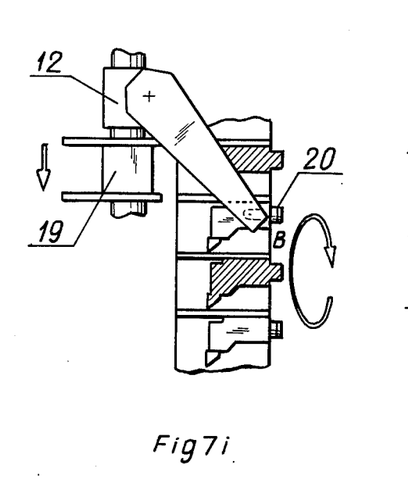
Figure 7J:
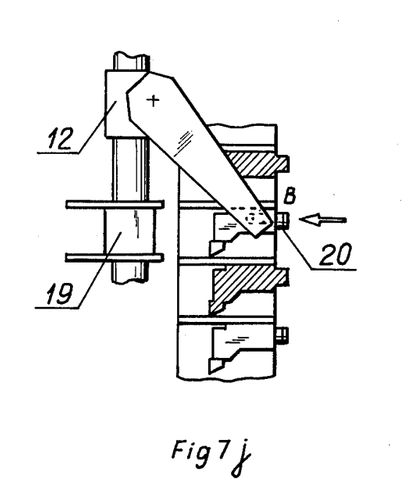
Figure 7K:
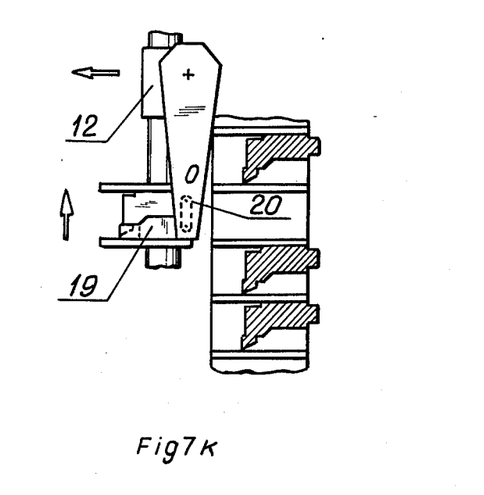
Figure 7L:
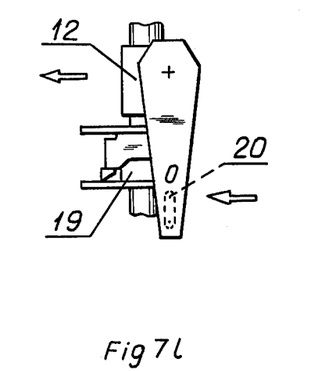
Figure 7M:
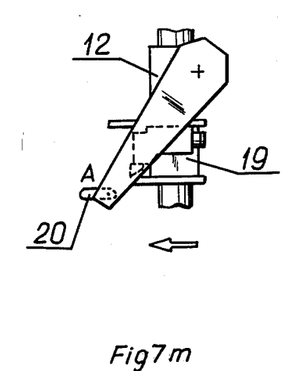
Figure 7N:
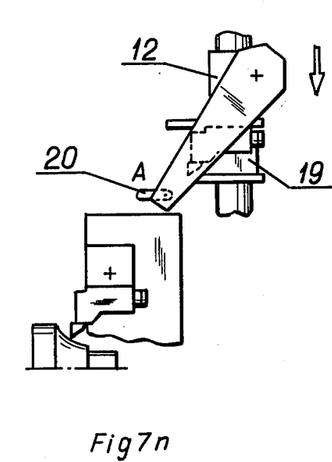
Figure 7O:
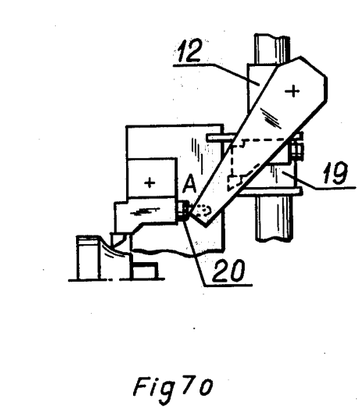

It will thus be seen that by the shifting of the valve 6, the hydraulic cylinder and piston function selectively to reciprocate the basic support frame in opposite horizontal directions parallel to the axis of the spindle of the lathe and thus to the axis of a workpiece W, shown in FIGS. 7a–7o, inclusive.

Mounted upon the column 5 for reciprocation in opposite vertical directions therealong is a slide 12, the slide 12 being driven by a hydraulic power cylinder 9 which is fastened to such slide. The hydraulic cylinder 9 has a piston rod 8, the outer end of which is rigidly attached to the upper end of the brace 3, as shown. A valve 25, fixedly mounted on the slide 12, is connected to a source of hydraulic pressure (not shown) and to the opposite chambers of the cylinder 9, which is of double-acting construction. The slide 12 carries mechanism for the straight-line transport of the tool unit from the unit magazine to the unit-carrying slide of the lathe, and vice-versa. A body 11 is fixed to the slide 12, body 11 mounting a head 28 in a bearing in such body. An elongated arm 13, in the form of a housing, is fastened at one end to the head 38, and thus can oscillate with respect to the slide 12. At the outer end of the lever or arm 13 there is journalled a sprocket 36 to the shaft of which there is affixed a lever arm 21, there being a finger 20 extending from the outer end of lever 21 at right angles thereto.

A second, larger sprocket 39 is disposed within the larger end of a housing which forms the arm 13. Sprocket 39 is rigidly affixed to a stub shaft 40 which in turn is fixed to the body 11. The sprockets 36 and 39 are connected by a two-part chain 37, one part of which is entrained about the sprocket 39 and the other part of which is entrained about the sprocket 36, the sets of confronting ends of the two parts of the chains being connected by turnbuckles composed of oppositely threaded screw-threaded parts 41, 43 which are connected by a nut 42 having oppositely threaded ends. The chain can thus be tightened by the appropriate adjustment of the turnbuckles.

Figure 3:
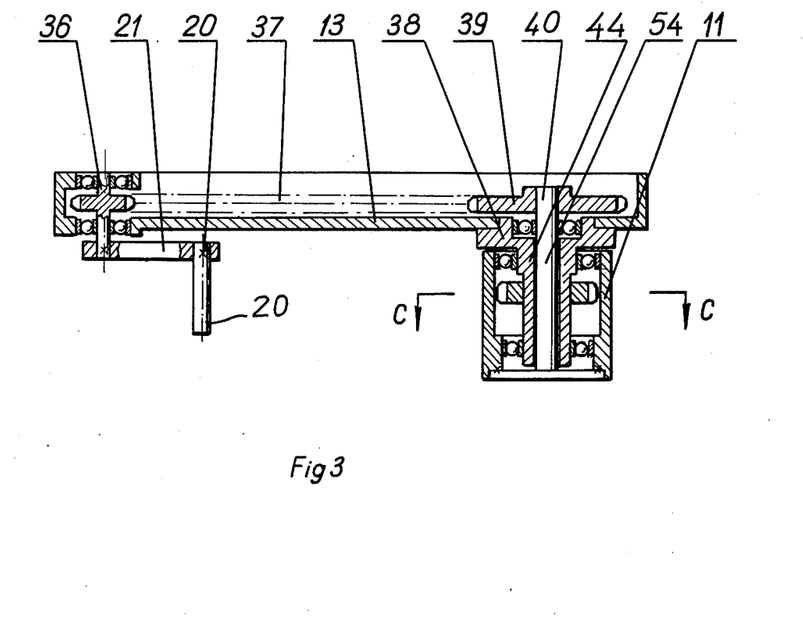
FIG. 3 is a schematic view in longitudinal vertical section of the mechanism for the translation of the tool unit.
Figure 4:
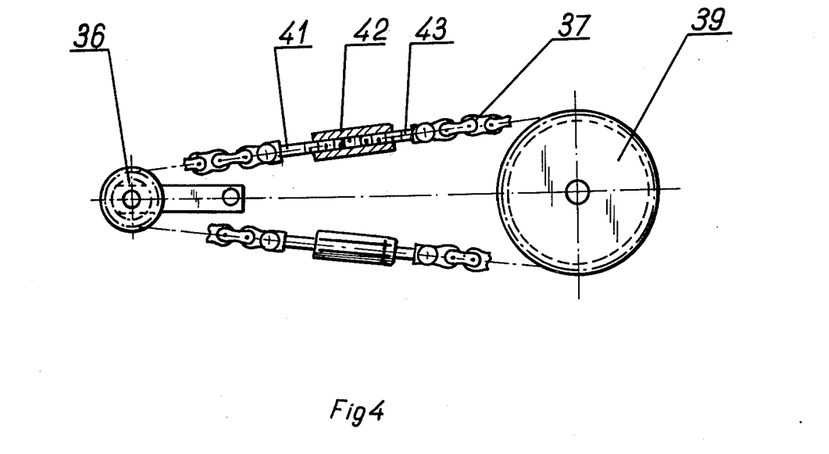
FIG. 4 is a view from above the apparatus shown in FIG. 3, but without the arm of the mechanism.

Rigidly fastened to the head 38 is a gear 44 (FIGS. 3 and 5) which meshes with oppositely disposed parallel racks 45 and 48 which are housed within the body 11. Fixed to the body 11 and coaxial with the rack 45 are oppositely disposed cylinders 10 and 15 which receive plungers affixed to the rack 45. Coaxial with the rack 48 and fixed to the body 11 is a cylinder 46 within which a plunger 47 reciprocates. Fastened to the body 11 (FIG. 2) are an elastic stop 27 and a rigid stop 29 which cooperate with a rigid stop 28 affixed to the arm 13 to determine the angle of rotation of the arm.

Figure 6:
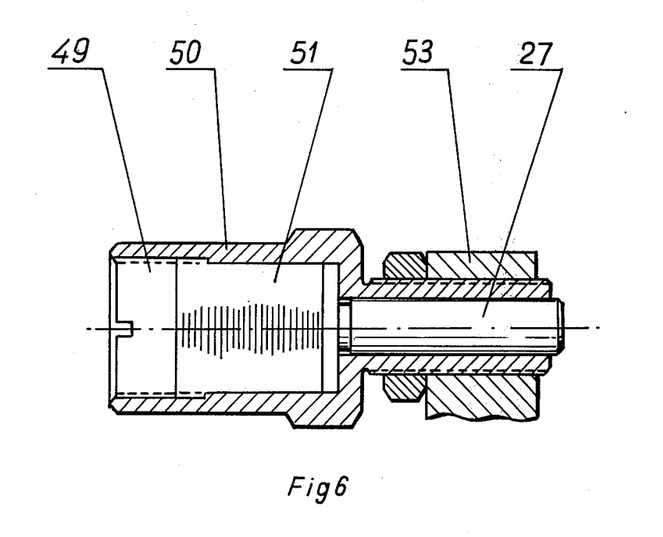
FIG. 6 is a view partially in elevation and partially in section of an elastic stop.

As shown in FIG. 6, the elastic stop 27 includes a cup-like body 50 having a threaded hollow stem which is threaded into a boss 53 affixed to the arm 13. The elastic top 27 is in the form of a plunger the right-hand of which (FIG. 6) protrudes beyond the threaded neck of the cup, and the left-hand end of which is enlarged to form a piston-like head within the cup 50. The cup 50 houses a number of stacked bent spring plates 51, such spring plates being held under compression by an externally threaded plug 49 which is screwed into the internally threaded left-hand end of the cup 50.

The tool changing device has a two-seat tool unit magazine including a slide 19, and upper and lower seats 17 and 18, respectively, which are affixed to the right-hand face of the slide 19 as the device is shown in FIG. 1. The seats 17 and 18 are of dovetail shape which are similar to and selectively aligned with corresponding seats on the tool unit fastening means on the tool carriage of rest of the lathe, so that when a seat 17 or 18 is aligned with the seat on the tool carriage of the lathe, a tool unit may be transferred from one to the other by being slid from one seat to the other.

The slide 19 is guided along the column 5 and is connected with the slide 12 through a cylinder 14 connected with the slide 12, such cylinder having a piston rod 16 the lower free end of which is connected to the slide 19. A long rod or key 22 of prismatic cross-section is hinged at its upper end to the slide 12 by means of a pivot pin 30 as shown in FIGS. 1 and 2. The key 22 lies parallel to the column 5 and slides in a groove in the slide 19. In the area to the left of the finger 20 (FIG. 1) the key 22 has an undercut portion 22a, the depth of the undercut 22a being such that its root lies level with the outer face of the main portion of the slide 19.

When the basic support frame, including the column 5, begins to move toward the machine rest or bed R, e.g. as it seeks the position of the tool unit fixing element on the machine rest in a longitudinal direction, and after the sensor 7 has engaged the stop 33, which is attached to the body of the machine rest or tool unit slide, there exists a predetermined distance between the column 5 and the body of the machine rest R; this distance is maintained, in the travel of the machine rest R in both directions, by means of synchronizing the movement of the basic support frame in its longitudinal traverse and the movement of the machine rest R. That is, after the sensor 7 has touched the stop 33, the following longitudinal traverse of the device begins. Whenever there is to be no following longitudinal traverse, the slide 12 is in its extreme upper position, which is determined by the stop 4 mounted on the column 5. With the beginning of the longitudinal following of the basic support frame, the slide 12 begins to move toward the axis of the main spindle of the lathe L, that is, toward the axis of the workpiece W, and hunting for the position of the fixing element on the machine rest R in a transverse direction begins. A stop 31 is fastened to the cross-slide of the machine rest R. When the sensor 26 has met the stop 31, the slide 12 occupies a definite position with respect to the cross slide of the machine rest R. This position is maintained in both directions by synchronizing the movement of the slide 12 with the movement of the cross slide of the machine rest R, that is to say, after the sensor 26 has touched the stop 31, the transverse following movement of the basic support frame of the tool changing device begins.

The tool changing device of the invention changes a tool in the fixing element of the machine rest R only when the longitudinal and transverse following movements of the basic support frame of the device function simultaneously.

When the slide 12 moves in an upper direction it stops after the sensor 26 has engaged the stop 4. This is the proper cross position of the slide 12, which is necessary for the changing of the tool in the magazine. After the slide 12 has occupied its extreme upper position, the following longitudinal movement of the basic support frame is stopped; the basic support frame of the tool changing device starts toward the stationary tool magazine M (FIGS. 7a–7o), and stops after the sensor 7 has touched the stop 35 which is fastened to the frame of the lathe L. In this situation, the tool changing takes place in the tool magazine M of the lathe L.

The finger 20 on the crank arm 21 effects the straight-line translation of the tool unit. When the arm 13 turns around the axis 54 (FIG. 3), as a result of the relative rotary motion which takes place between the arm 13 and the stationary sprocket 39, the chain 37 acting upon the sprocket 36 turns the lever arm 21 in a direction which is opposite to the direction of rotation of the arm 13. The parameters of the transmission are made up of the arm 13, the sprocket 39, the chain 37, and the sprocket 36, are such that the trajectory of the finger 20 is very close to a straight line. While the tool changing mechanism is operating, the finger 20 can occupy three positions: an intermediate position O and two extreme positions A and B (FIG. 2), determined by the respective positions of the arm 13. These extreme positions are adjusted by means of the stops 27 and 29 which selectively engage the stop 28 fastened to the arm 13. The longitudinal coordinate of the finger 20 in its extreme positions A and B are attained with great precision since the lever 21 in its end positions is parallel to the trajectory of the finger 20. The slight angular deviations of the lever 21, the result of looseness in the connecting gear, do not affect the longitudinally adjusted coordinate.

Figure 5:
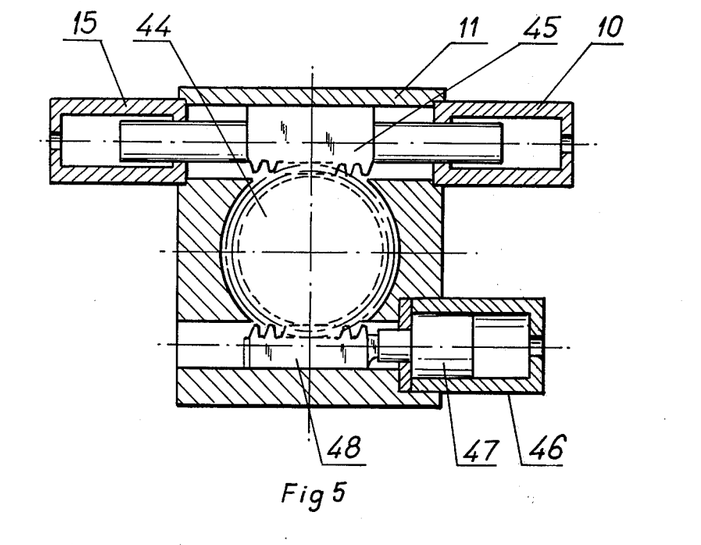
FIG. 5 is a cross-sectional view taken along the line C—C in FIG. 3.

The three positions of the arm 13, and also the directions in which it moves to reach such positions, are determined by the various combinations of the manners of energization and deenergization of the hydraulic cylinders 10, 15 and 46 (FIG. 5).

The intermediate position of the arm 13 in both directions of approach to it is determined when the cylinder 15 is switched to oil-drain, the cylinders 10 and 46 are switched on oil-feed and the plunger 47 rests in the rack 48. The plunger 47 acts as a limiter, fixing the intermediate position of the mechanism for straight-line translation of the tool units; this position corresponds to the intermediate position of the arm 13. The required stability of this limiter is determined by the correlation between the cross-sections of the cylinders 10 and 46, the cylinder 46 having the larger cross-section. The above-described construction ensures a positioning of the arm 13 in its intermediate position O which is free from play.

The elastic stop 27 yields when the pressure on it exceeds a given predetermined value. As a result, the mechanism for straight-line translation of the tool unit is safe from overloading, as might happen if a tool unit should become stuck or jammed on the machine rest R, which might occur upon the lack of synchronism of the following longitudinal traverse when the machine rest R starts moving at a high speed in a direction toward the main spindle of the lathe L. The necessary resistance to movement of the stop 27 is achieved by a tightening of the package of plate springs 51 by the plug 49. By screwing such plug in and out of the cup 50, the face of the plunger of the elastic stop 27, which determines the end position A of the finger 20, is shifted.

The slide 19 of the two-seat tool magazine 17, 18 takes part in the following cross-traverse together with the slide 12 to which it is connected, the slide 19 having two positions with respect to the slide 12. The distance through which the slide 19 travels between these two positions is equal to the distance between the seats 17 and 18, so that the upper seat 17 occupies either of the positions C and E, and the lower seat 18 occupies either of the two positions E and D, the distance between the positions C and E on the one hand, and E and D on the other hand, being equal. The position C, D and E, which a tool unit may occupy, is correlated with the position of the finger 20. The transition of the slide 19 from one position to another takes place when the finger 20 is in its intermediate position O. The changeable tool units are pushed along the quideways of the seats 17 and 18 by the finger 20. In the various positions which the slide 19 occupies with respect to the slide 12, a tool unit is selectively delivered to the finger 20 or is led away from it. In the position D of the two-seat magazine of the device, there can take placce a longitudinal delivery of a tool unit to or a leading of a tool unit away from one or the other seats 17, 18 of the magazine.

The necessary longitudinal locking of the tool unit on the two-seat magazine in the positions C and E is done by means of the prismatic key 22 pivotally attached to the slide 12 by the pivot pin 30. The key 22 is provided with a cut-out portion 22a which, when the slide 12 is in its lowermost position in the cut-out portion of the key 22a is disposed in position D, permits the longitudinal translation of the tool unit. When, during the travel of the slide 19, the tool unit shifts into position C or E, the key 22 enters a groove in the lower wall of the tool holder, thereby locking the tool holder from longitudinal translation.

The above-described sensor 7, in the embodiment shown, is a microswitch, and the valves 6, 25, etc. are electromagnetic valves controlled by the sensor.

Each of the tool units U has a formation in the rear surface thereof, such as an undercut groove, and the finger 20 of the device has on its end a formation interfitting with the groove, whereby the finger 20 can both push and pull the tool units. Tool changing in the fixing element on the machine rest R is done by performing the movements shown in FIGS. 7a, 7b and 7c, the transport units of the tool changing device simultaneously following the movements of such fixing element. In the initial position, shown in FIG. 7a, the finger 20 has the formation thereon matingly engaged in the groove in the tool holder TH for pulling the tool unit U away from the lathe rest R. At that time, the slide 19 is in its upper position C and the lower tool seat 18 is empty. After the fixing element on the tool rest R has been loosened, the tool unit U begins to shift to the right (FIG. 7a) toward the lower seat 18; this movement of the arm 13 and the finger 20 continues until the finger 20 occupies the intermediate position O (FIG. 7b). After that, the slide 19 moves toward its lower position D (FIG. 7c). In this last position, the new tool unit and tool seat 17 is located horizontally opposite the fixing element on the lathe rest R. The arm 13 then swings clockwise so that the finger 20 thereon pushes the new tool unit U into the fixing element on the rest R, until the position shown in FIG. 7d is reached, wherein the finger 20 is in the position A and the tool unit U has been fully mounted in the fixing unit of the machine rest R.

After the tool unit U has been gripped by the fixing element on the rest R, the slide 12 is led to its upper position (FIG. 7e). After this, the basic support frame, including the column 5, moves horizontally to the right toward the stationary (but rotary) tool magazine M of the machine. At the same time, the movement shown in FIGS. 7e and 7f are being performed: the finger 20 is moved into an intermediate position (FIG. 7b) after the slide 19 has moved to its upper position C (FIG. 7g). In this position the tool unit comes to a cross position ready for a tool change, the mating formation upon the finger 20 already having entered the groove in the tool holder TH so as to be ready to lead that particular tool unit U away.

After the tool changing device is stopped in a longitudinal position ready for a change (FIG. 7a), the movement shown in FIGS. 7h, 7i and 7k follow. The tool unit is drawn into the magazine M of the machine by the arm 13 until the finger 20 reaches the extreme position B (FIG. 7i). After that, the magazine M turns until it brings a new tool unit U into the position (FIG. 7k) ready for a tool change, then the tool unit is drawn out of the upper seat 17 of the two-seat magazine of the tool changing device, while the finger 20 reaches its intermediate position O (FIG. 7k). With this, the loading of the tool changing device with a new tool unit U has finished, and the basic bearer frame including the column 5 begins to follow the fixing element of the rest R of the lathe L.

During the longitudinal translation of the device toward the rest R, the following movements, shown in FIGS. 7l and 7m are being carried out: The slide 19 shifts to its upper position (FIG. 7m) and the arm 13 is swung to the left (FIG. 2) so that the finger 20 assumes its extreme position A (FIG. 7n). From the moment of reaching the adjusted longitudinal distance between the slide 12 and the machine rest R, the slide 12 starts shifting toward the fixing element on the machine rest R until it stops in the previously adjusted cross position as regards the fixing element (FIG. 7o). As a result of this movement the formation on the finger 20 enters the groove on the tool holder TH so that the tool unit U may be led away by the finger. The position (FIG. 7o) of all mechanisms and units of the tool changing device with respect to the fixing element on the machine rest R is preserved by means of the following cross-traverse of the slide 12 and the following longitudinal traverse of the column 5. With the parts in such position, it can be seen that they have been returned to the position of FIG. 7a, so that the next tool changing operation can begin.

Although the invention is illustrated and described with reference to one preferred embodiment thereof, it is to be expressly understood that it is in no way limited by the disclosure of such a preferred embodiment, but is capable of numerous modifications within the scope of the appended claims.

What is claimed is:

1. A lathe including device for automatic tool changing said lathe having a spindle with a horizontal axis, the tools of the lathe being fixed in tool holders and together with the tool holders forming tool units, the lathe being supplied with a first tool magazine located stationary relative to said horizontal axis, the lathe having a tool rest on which the changeable tool units are fastened in a one-seat mounting element, and means for fixing a tool unit on said mounting element, the tool changing device comprising a support frame mounted for reciprocation between the tool rest and the first magazine of the lathe parallel to the spindle axis, the support frame having a vertical beam extending transverse to the spindle axis, the improvement wherein the device further comprises a first slide supported for non-rotatable vertical reciprocation on the beam toward and away from the spindle axis, a second slide supported for non-rotatable vertical reciprocation on the beam relative to the reciprocation of the first slide, means for reciprocating the second slide with respect to the first slide, a two-seat magazine for the tool units fixedly mounted on the second slide, and means carried by the first slide for linearly translating tool units along the spindle axis between the first and second magazines and between the second magazine and the fixing means on the tool rest of the lathe, the translating means including means for horizontally introducing the tool units into and horizontally withdrawing the tool units from the fixing means, the first magazine, and the second magazine, respectively.

2. The lathe of claim 1, wherein the translating means comprises an arm pivotally mounted at one end on the first slide, and a tool holder engaging finger movably attached to the other end of said arm, the finger and tool holder having mating interlocking formations whereby the arm in its acting through the finger can both push and pull the tool in its translation.

3. The lathe of claim 2, comprising a power transmission connected between the arm and the finger, said power transmission being so constructed and arranged that, upon the rotation of the arm from one extreme position thereof to the other, the finger is moved in synchronism therewith but rotates in the opposite direction about its axis of rotation from the direction of rotation of the arm.

4. The lathe of claim 3, comprising power means for oscillating the arm about its axis, and wherein the power transmission between the arm and the finger comprises a stationary sprocket mounted upon the axis of oscillation of the arm, a second sprocket mounted on the central pin of a crank arm journalled on the outer end of the arm, the finger being mounted eccentrically on said crank arm, and a chain tightly entrained over said two sprockets, whereby oscillation of the arm causes synchronized oscillation of the finger.

5. The lathe of claim 2, comprising means for oscillating the arm including a shaft upon which the arm is mounted and about the axis of which the arm oscillates, a pinion coaxial of the arm and affixed thereto, opposed parallel racks in mesh with opposite sides of said pinion, and hydraulic cylinder means for selectively rotating said pinion.

6. The lathe of claim 1, comprising guide means affixed to the respective ends of said column, said guide means cooperating with guideways on the body of the lathe, and a double-acting hydraulic cylinder provided with a controlling valve for reciprocating the support frame transverse to the axis of the spindle of the lathe.

7. The lathe of claim 1, comprising an elongated prismatic key member affixed to the first slide, said key member having a cut-out portion intermediate its length, the key member cooperating with the tool holders for preventing movement of the tool unit in the guideways of the two-seat tool magazine in the extreme positions of said magazine, while permitting movement of the tool units along the guides when the two-seat tool magazine is in its intermediate position.

8. A method for automatic tool changing in a lathe wherein the tools are mounted in tool holders, the lathe having a work holding spindle with a horizontal axis, a tool rest adjacent the spindle for operatively clamping a tool holder, a first tool magazine having a plurality of tool holder compartments located stationary relative to the horizontal axis, a support frame movable between the tool rest and the first magazine parallel to the horizontal axis, first and second slides mounted on the support frame for transverse movement thereon with respect to the horizontal axis, a two-seat second tool magazine mounted on the first slide, and pivotable arm having a tool holder engaging finger mounted on the second slide, the method comprising the step of positioning the support frame adjacent the first tool magazine, positioning the second slide on the support frame to line up one of the seats of the second tool magazine with a compartment of the first magazine, positioning the first slide on the support frame to engage the tool engaging finger with a tool holder in the compartment of the first magazine, pivoting the arm and simultaneously moving the tool engaging finger with respect to the arm in such a manner that the free end of the tool engaging finger performs a substantially rectilinear movement along the horizontal axis, thereby to remove a tool holder from said compartment and inserting it into said seat, positioning the frame adjacent the tool rest, positioning the second slide on the frame to line up the empty seat on the second tool magazine with the tool rest, positioning the first slide on the frame to align the tool engaging finger with a tool holder in the tool rest, positioning the arm and simultaneously moving the tool engaging finger with respect to the arm in such a manner that the free end of the tool engaging finger performs a substantially rectilinear movement aong the horizontal axis, thereby to remove a tool holder from the tool rest into the empty seat of the second tool magazine, positioning the second slide to line up the other seat of the tool magazine with the tool rest, pivoting the arm and simultaneously moving the tool engaging finger with respect to the arm in such a manner that the free end of the tool engaging finger performs a substantially rectilinear movement along the horizontal axis, thereby to insert a tool holder from said other seat into the tool rest, and positioning the frame adjacent the first tool magazine.

* * * * *